United States Patent [19]

Mattei

[11] Patent Number: 4,913,185
[45] Date of Patent: Apr. 3, 1990

[54] VALVE DEVICE USABLE FOR FEEDING STERILE FLUIDS

[75] Inventor: Vittorio Mattei, Modena, Italy

[73] Assignee: Tetra Dev-Co, Modena, Italy

[21] Appl. No.: 323,850

[22] Filed: Mar. 15, 1989

[30] Foreign Application Priority Data

Mar. 15, 1988 [JP] Japan .................. 63-63062

[51] Int. Cl.⁴ ............................................. F16K 11/10
[52] U.S. Cl. ..................... 137/241; 137/240; 137/614.21
[58] Field of Search .............. 137/240, 241, 614.21

[56] References Cited

U.S. PATENT DOCUMENTS 1,624,573  4/1927  Bagby .......................... 137/241 X
3,643,679  2/1972  Hansson ........................ 137/241

FOREIGN PATENT DOCUMENTS 49-28392  7/1974  Japan .

Primary Examiner—Gerald A. Michalsky

[57] ABSTRACT

A valve device for use in a transfer line for sterile fluid production material that communicates fluid from a supply pipe for the sterile fluid production material by opening and closing the flow path for the operating line including a first valve operatively connected to the supply pipe and a second valve operatively connected to a delivery pipe for at least communicating fluid to processing stages for the above-mentioned sterile fluid production material. A first valve plug is operatively mounted within the first valve. A second valve plug is operatively mounted within the second valve. A steam inlet pipe and a steam outlet pipe is positioned substantially perpendicular to a common axis of the first and second valves and on a line dividing substantially in half the gap between facing first and second valve plugs of the first and second valves and opening on opposite sides of the gap so as to form a chamber between the first and second valve plugs.

13 Claims, 6 Drawing Sheets

VALVE DEVICE USABLE FOR FEEDING STERILE FLUIDS

BACKGROUND OF THE INVENTION

1. Field of the Invention

The present invention relates to a valve device for use in a transfer line for sterile fluid production material. A device is provided for feeding the sterile fluid production material by using the valve device through production processing stages, such as filling a container with the sterile fluid production material during packaging. The device is particularly suited for thick, high-viscosity materials such as ketchup. More specifically, the invention relates to a valve device used in the section that draws the sterile fluid production material from the main pipe, which is the transfer line for the sterile fluid production material, into the production processing stages and not only opens and closes the transfer line, but also enables residue within the valve device to be removed and the interior of the valve device to be cleaned and easily disinfected while also completely preventing contamination of production material which flows through the main pipe. The invention also pertains to a device wherein the valve device is used for transferring sterile fluid projection material from the main pipe to various production processing stages such as filling during packaging, storing, and other processing stages. Efficient cleaning and disinfecting of the section that draws the sterile fluid production material is provided for completely preventing contamination of production material which flows through the main pipe, and increasing production efficiency of the sterile production processing stages.

2. Description of Background Art

Previously, in order to transport the sterile fluid production material to a production processing stage, for example, sterile filling of containers in the packaging line, multiple packaging machines were designed for a concurrent supply of product from at least one main pipe which was the product line. The packaging machines were constructed so that the aforesaid production material to be filled and packaged in containers was directly drawn from the main pipe.

When the packaging machines are required to suspend production for a short or long interval for various reasons, the packaging machines need to be cleaned and disinfected. However, the cleaning and disinfecting of one or more packaging machines that form part of a packaging line consisting of multiple packaging machines must satisfy requirements based on bacteriological as well as hygienic considerations.

Accordingly, the valve device which is used at distribution points, which controls the flow to the filling sections of the packaging machines, along the main pipe for transporting product to the various filling processes, must be able to supply product while maintaining it in a sterile state during production, i.e., during filling. A valve device for this purpose is constructed so that it prevents the inflow of cleaning fluid when the inflow of sterile fluid (product) into the inflow pipe of the packaging machine is permitted, and prevents the inflow of sterile fluid (product) when the inflow of cleaning fluid into the inflow pipe is permitted. A valve is provided for opening and closing the inflow from the main pipe and a valve for opening and closing the inflow from the cleaning pipe to the connecting section between the inflow pipe of the packaging machine and cleaning pipe. Switches are provided between the inflow of the transport fluid, which is the sterile production material, and the cleaning fluid by movement of the valve plugs. The device also enables steam to be supplied to the independent space that is solely within the valve mechanism into which neither transport fluid nor cleaning fluid flows when transport fluid inflow is prevented to disinfect and cleanse the interior of the valve mechanism (e.g., Japanese Patent Publication No. 49-28392). Valves having a different construction but employing comparable methods are currently in use.

OBJECTS AND SUMMARY OF THE INVENTION

In the conventional valve device described above, when operation of the packaging machine is suspended and the filling mechanism of the packaging machine is cleaned, the interior of the valve device is cleaned by opening the valve for opening and closing the inflow from the cleaning pipe attached to the connecting section between the valve for opening and closing the inflow from the main pipe of the valve device and the inflow pipe of the packaging machine and by applying pressure to the cleaning fluid so that the cleaning fluid would drive out residue in the space, gap between valve and housing, of the connecting section into the aforesaid filling pipe side, that is, into the filling machine side. Consequently, when the next processing started, packaging waste inevitably occurred because of the residue that had entered the filling machine. In addition, there was a problem with high-viscosity fluid production material because the interior of the valve mechanism could not be sufficiently cleaned.

Based on the above points, the present invention proposes to furnish a valve device attached to a main pipe when sterile production material is communicated from the main pipe to production processing stages such as filling that keeps residue in the space of the connecting section in the valve device from entering into the machine of a production processing stage such as filling when cleaning the valve device connected to the production processing stage at a time when processing of the production processing stage is suspended. The valve device can completely prevent contamination of production material flowing through the main pipe when a machine connected to the valve device is halted and another machine begins to operate. Further, the valve can increase the disinfecting and cleaning effectiveness by simplifying cleaning of the interior of the valve mechanism even for high-viscosity fluid production materials. In addition, the valve can completely eliminate the fear of product line contamination that maintains the aforesaid production material in a sterile state while supplying the sterile production material to production processing stages such as filling, halting the supply, or initiating a cleaning operation. Thus, increased production efficiency is achieved after cleaning and prior to the next production processing.

To accomplish the aforesaid objectives, the valve device of the present invention for use with sterile production material is connected to a supply pipe, which is the main pipe forming the product line. Thereby, the valve device is equipped with a connecting pipe for communicating fluid. The valve device has a first valve for opening and closing the flow path from the supply pipe, and a second valve that opens and closes the flow path from the valve. The second valve faces the first valve along the operating axis of the first valve which is positioned nearby so as to have a common operating axis with the two valves. A delivery pipe is connected to the valve device so as to at least communicate fluid to the production processing stages for the aforesaid production material. The valve device is further equipped with a steam inlet pipe and steam outlet pipe positioned perpendicular to the common axis of the pair of valves and on the line dividing in half the gap between the two facing valve plugs of the valves and opening on opposite sides of the gap so as to form a chamber between the valve plugs.

The valve equipped with the delivery pipe for communicating fluid to the aforesaid production processing stages should be equipped with the cleaning fluid inlet pipe.

Moreover, for reasons described later, it is more efficient if the facing surface of the two aforesaid facing valve plugs are hemispherical in shape.

Furthermore, concerning the chamber formed by the space between the aforesaid valve plugs and the steam inlet pipe and steam outlet pipe, the diameters of the steam inlet pipe and steam outlet pipe should widen in the areas connecting on the chamber to form hollow cones so that the interior ends of these are positioned at the openings, valve seats, of the two facing valves. A steam diverter having a hollow cone connected to a hollow small-diameter section should be located inside the steam inlet pipe so that there is a fixed gap between the steam diverter and the inner wall of the end section of the steam inlet pipe.

The basic device, which feeds sterile fluid production material to production processing stages such as filling by using the aforesaid valve device for the sterile fluid production material, has a steam inlet pipe connected to a steam source through a steam valve that opens and closes the flow path of the steam inlet pipe and a steam outlet pipe connected to a discharge pipe through at least a steam barrier which forms a barrier to sterilizing steam on the valve device side, wherein the pair of facing valves of the valve device for sterile fluid production material open and the steam valve and steam barrier close when production material processing stages are started and the sterile fluid production material is supplied to the production processing stages. The pair of facing valves of the valve device for sterile fluid production material close and at least the steam valve and the steam barrier open when the production processing stages are stopped.

Also, in the aforesaid basic device for feeding sterile fluid production material to production processing stages such as filling by using the valve device for the sterile fluid production material, in order to further ensure a sterile environment inside the valve device when the production processing stages are started and the sterile fluid production material is supplied to the production processing stages and to perform this efficiently when cleaning, the steam inlet pipe of the valve device for sterile fluid production material is connected to the steam source through a first steam valve that opens and closes the flow path thereto. The steam outlet pipe is connected to a discharge pipe through a steam barrier and a flutter steam barrier connected in order following the steam outlet pipe. A second steam valve is located on a pipe that connects the pipe connecting the steam valve and the steam source to the pipe communicating fluid between the steam barrier and the flutter steam barrier on the discharge pipe side so as to open and close the path between the two pipes. The cleaning fluid inlet pipe connected to the valve on the delivery pipe side of the valve device is arranged to permit intermittent communication of fluid from the cleaning unit so that communication of the fluid from the cleaning unit is stopped at all times other than when cleaning the cleaning fluid inlet pipe. The pair of valves in the valve device and the second steam valve are open and the first steam valve, steam barrier, and flutter steam barrier are closed when the production processing stages are started and the fluid production material is supplied to the processing stages. Thus, in this case, the flutter steam barrier becomes a pulsating intermittent barrier. The pair of valves in the valve device and the second steam valve are closed and the first steam valve, the steam barrier, and the flutter steam barrier are open when the production processing stages are halted. The pair of valves in the valve device, the second steam valve, and the flutter steam barrier are closed and the first steam valve and the steam barrier are open when the production processing stages are temporarily halted. At least the supply pipe-side valve in the valve device, the second steam valve, and the flutter steam barrier are closed and the steam barrier is open while either the delivery pipe-side valve in the valve device is closed and the first steam valve is open or the delivery pipe-side valve in the valve device is open and the first steam valve is closed during cleaning so that the cleaning fluid is supplied from the cleaning unit through the inlet pipe to the delivery pipe-side valve of the valve device.

The steam barrier and the flutter steam barrier should preferably use deformable valve membranes.

When production processing stages for sterile fluid production material are operating so that fluid in the main pipe, that is, the sterile fluid production material supply pipe which is the transfer line for sterile fluid production material, is being communicated through the connecting pipe attached to one of the facing valves of the valve device having the aforesaid configuration and fluid is being communicated into the aforesaid production processing stages for production material through the delivery pipe attached to the other valve, then by keeping the aforesaid pair of valves open and both the steam inlet pipe and steam outlet pipe closed, sterile production material can be transferred to the production processing stages and production can continue. If production is halted by halting the production processing stage machines, then by closing the aforesaid pair of valves and forcing in steam having a fixed pressure from the aforesaid steam inlet pipe so that steam flows out through the steam outlet pipe, fluid production material residue between the pair of facing valve plugs and the aforesaid steam inlet pipe and steam outlet pipe, which had been closed while production continued, will be discharged from the steam outlet pipe so that no residue enters the production processing stage machines. By filling the space between the pair of closed valves with steam from the steam inlet pipe after the residue has been discharged, the main pipe side of this valve device can be isolated by sterilizing steam, preventing contamination of the main pipe side.

By attaching a cleaning fluid inlet pipe to the valve within the pair of facing valves which is connected to the delivery pipe for the production processing stages, the internal section between the halted machines and the valve device can be cleaned easily.

Furthermore, by making the facing surfaces of the facing valve plugs hemispherical in shape, the flow path of the steam flowing in from the steam inlet pipe narrows, causing the steam flow velocity to increase, thereby discharging the residue from the aforesaid section by forcefully blowing the residue out towards the outlet pipe; in particular, thick high-viscosity residue can be effectively discharged.

Moreover, by placing a steam diverter inside the steam inlet pipe, the steam flow is forcefully directed near the base of the hemispherically shaped valve plugs, that is, near the area where the facing valves open, enabling residue to be removed more effectively from the areas, corner sections, where residue is likely to remain.

The valve device for sterile production material, which has a steam inlet pipe on one side that connects the valve device to a steam source through a steam valve that opens and closes the flow path thereto and which has a steam outlet pipe on the other side that connects the valve device to a discharge pipe through at least a steam barrier, is basically a device that keeps residue which is inside the valve device from entering machines of the production processing stages and prevents contamination of the main pipe side. By controlling the opening and closing of the pair of valves in the valve device and the opening and closing of the steam valve and the steam barrier, at least a sterile state can be maintained when machines of the production processing stages are operating and sterile fluid production material is transferred to the production stages from the main pipe side, which is the product line, and by discharging from the discharge pipe the fluid production material residue that remains in the space (chamber) between the pair of facing valve plugs of the valve device and the steam valve and steam barrier when production is halted by stopping the production processing stage machines. Residue is kept from entering the production processing stage machines so that the next production processing activity can begin expediently. Also, by closing the steam barrier and filling the aforesaid chamber with sterilizing steam after discharging the residue as described above, a barrier is created by the sterilizing steam which protects the sterile fluid production material flowing through the connecting pipe of the steam valve from contamination.

Again, the device, wherein a flutter steam barrier is located between the steam barrier and the discharge pipe and wherein a second steam valve is located on a pipe that connects the pipe connecting the steam source and the first steam valve to the pipe connecting the steam barrier and the flutter steam barrier so as to open and close the steam path between the two pipes, and wherein the cleaning fluid inlet pipe is connected so the valve on the delivery pipe side of the valve device so that cleaning fluid can be transferred intermittently from the cleaning unit, can completely and reliably maintain a sterile state when the production processing stage machines are operating and fluid production material is flowing through the valve device. Since sterilizing steam covers even the discharge pipe side of the steam barrier when the pair of valves in the valve device are open, the first steam valve and the steam barrier are closed, and sterile fluid production material is being transferred to the production processing stage. By closing the aforesaid pair of valve plugs and passing steam between the pair of valve plugs and the first steam valve and steam barrier when operation of the production processing stage machines is temporarily halted or when the machines are halted and cleaned while other machines of the product line are operating, the connecting pipe side of the valve device, that is, the main pipe of the product line side is completely isolated by a sterilizing steam barrier which protects the sterile production material flowing through the main pipe from contamination. Also, by opening and closing the flutter steam barrier in a pulsating manner, steam having a fixed pressure escapes gradually and the hot sterilizing steam forms a barrier so that a sterile environment can be maintained in areas where the sterile fluid production material is transferred. In this way, by controlling the pair of facing valves of the aforesaid valve device, the first and second steam valves, the steam barrier, and the flutter steam barrier, and by suitably interrupting communication of fluid between the cleaning unit and valve device, production due to the operation of machines in the production processing stages, cleaning of the valve device and machines, and disinfecting of the valve device can be performed effectively.

Furthermore, by using deformable valve membranes in the steam barrier and flutter steam barrier and by using electromagnets to drive the valve membranes unevenly, the flow of thick high-viscosity fluid production material can be controlled smoothly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, an wherein.

PREFERRED EMBODIMENT

To clarify further the purpose and characteristic features of the present invention, a preferred embodiment of the valve device of the present invention and of the device for feeding sterile fluid production material to production processing stages for the sterile fluid production material is described, referring to the appended drawings below for the case in which the invention is used with packaging machines.

Figure 1:
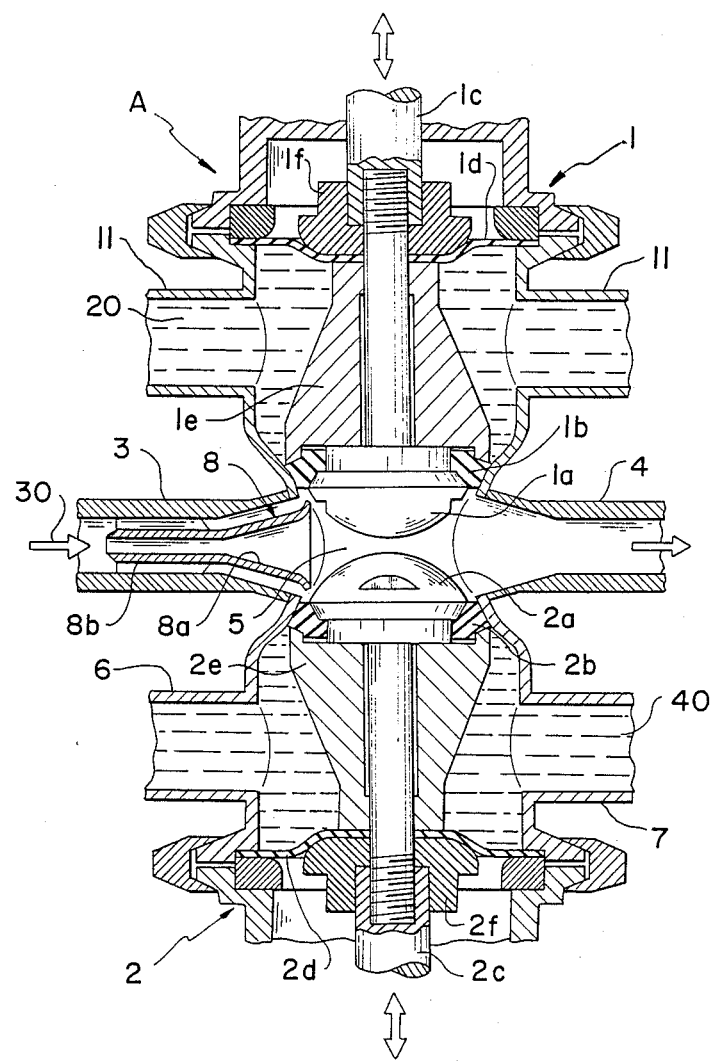
FIG. 1 is a profile of the detailed structure for the sterile production material valve device.

FIG. 1 illustrates the essential parts of the valve device of the invention and the fluid flow within the valve device showing the state in which production has been suspended as described later for the filling units. The valve device controls both the fluid flow and the communication of fluid. In FIG. 1, the filling machines are being cleaned.

A valve device A is attached through a supply pipe 11 to a main pipe, not illustrated, wherein the main pipe is the product line for transporting fluid production material 20 in a sterile state from a storage tank containing the sterile fluid production material. The valve device A is connected to a filling unit, not illustrated, wherein the filling unit is a production processing stage for the sterile fluid production material 20 so that a delivery pipe 6 communicates fluid to the filling unit. A connection with other pipes, not illustrated, is formed at a suitable position on the supply pipe 11 and delivery pipe 6.

Multiple packaging machines each directly draw the aforesaid sterile fluid production material through the valve device A so that the production material is supplied from the aforesaid main pipe concurrently to the multiple packaging machines.

The valve device A is designed to handle thick, high-viscosity production material as sterile fluid production material flowing through the valve device A. The fluid production material 20 is a liquid or semi-liquid material, for example, tomato ketchup, which may or may not contain granules.

The valve device A is arranged so that a pair of facing valves 1 and 2 are located close to one another wherein the operating axes of the valves 1 and 2, operating axes of the functioning units containing the valve plugs, lie along the common line, and a steam inlet pipe 3 and steam outlet pipe 4 are, as described later, connected as a unit between the pair of facing valves 1 and 2. A pair of supply pipes 11 and 11, and a delivery pipe 6 for delivering either fluid production material 20 or cleaning fluid 40 to the filling unit, not illustrated, and an inlet pipe 7 for introducing cleaning fluid to valve 2 for introducing sterile fluid production material 20 to valve 1 are mounted symmetrically on opposite sides of the operating axis. The inside ends of valve 1 and valve 2, which are facing each other, are equipped with valve plugs 1a and 2a having surfaces that are nearly hemispherical in shape. The contact surfaces on the bases of the valve plugs are equipped with leveled, elastic, circular rings 1b and 2b that come in contact with the inner surfaces of the valve seats, which are the openings on the ends of the interior side of the housing of said facing valves 1 and 2. The shafts of said valve plugs 1a and 2a are screwed into the tips of rods 1c and 2c, and the rods 1c and 2c are driven up and down by electromagnets, not illustrated, that are located on the central axis and at the outside ends, top and bottom parts of FIG. 1, of the facing valves 1 and 2 so that a drive current from a control unit, not illustrated, can produce a reciprocating motion along the operating axis of the valves.

Also, flexible partitions, 1d and 2d, maintain watertightness by following the reciprocating motion of valve plugs, 1a and 2a. The flexible partitions, 1d and 2d, are located near the joints, respectively, of aforesaid rods, 1c and 2c, and shafts of valve plugs, 1a and 2a. The central parts of the flexible partitions, 1d and 2d, are affixed to their respective shafts and held between intermediate parts, 1f and 2f, and spacers 1e and 2e, which have truncated conical shapes, while the outer perimeters of the partitions, 1d and 2d, are supported by the housings of the valves 1 and 2. Moreover, steam inlet pipe 3 and steam outlet pipe 4 are positioned perpendicular to the common axis of the two facing valves 1 and 2 and on the line dividing in half the gap, maximum or minimum, between facing valve plugs 1a and 2a of the valves 1 and 2. In other words, the pipes 3 and 4 are positioned on the line dividing in half the gap between the valve seats on the inside ends of the housings of the valves 1 and 2 and the opening on opposite sides of the gap so as to form a chamber 5 between the facing valve plugs 1a and 2a. The diameters of the steam inlet pipe 3 and the steam outlet pipe 4 widen in the areas connected to the chamber, that is, in the areas connected to the housing that forms the chamber 5 in order to form hollow cones. The interior ends of the pipes 3 and 4 are positioned at the openings, valve seats, of the facing valves 1 and 2. A steam diverter 8 having a hollow cone 8a connected to a hollow small-diameter section 8b is located inside the steam inlet pipe 3 so that there is a fixed gap between the steam diverter 8 and the inner wall of the steam inlet pipe 3, and the steam diverter 8 is held in place by thin supporting parts so as not to obstruct the flow of steam. In the configuration above, if the steam inlet pipe 3, steam outlet pipe 4, and inlet pipe 7 of valve 2 are closed and the pair of valve plugs 1a and 2a are open, then sterile fluid production material 20 can be transferred from the delivery pipe 6 to a filling unit. If the pair of valve plugs 1a and 2a are closed and sterilizing steam 30 is blown in from steam inlet pipe 3, the steam 30 that passes through the central portion of the steam diverter 8 will be constricted in the narrowed gaps between the closed pair of valve plugs 1a and 2a causing steam-flow velocity to increase and steam to blow residue of fluid production material 20 between valve plugs 1a and 2a towards the steam outlet pipe 4 with a strong force, thereby increasing the cleaning effectiveness in the space formed by the gap. The portion of the blown-in steam 30 that passes along the outside of the steam diverter 8 is guided by the hollow cone 8a portion of the steam diverter 8 causing the velocity to be increased by the narrow gap near the valve opening, so that residue in the area, corners, where stagnation is likely to occur near the base of the valve plug is blown from the outer perimeter of the base to the steam outlet pipe. Thus, the cleaning effectiveness is increased, particularly for thick, high-viscosity residue. If the space between the pair of closed valves is filled with steam from steam inlet pipe 3 after the residue is blown out into the steam outlet pipe 4, then the valve 1, which is on the product line side, is isolated by sterilizing the steam from the valve 2, which is on the delivery pipe 6 side, regardless of the status on said delivery pipe 6 side, maintaining a completely sterile state for the valve 1 and, therefore, for the product line. In the preferred embodiment above, the pair of supply pipes 11 and 11 that are attached to valve 1 are connected to valve device A so that sterile fluid production material 20 is supplied from one of the supply pipes 11 and communicated to the next filling unit from the other of the supply pipes 11. In addition, as described previously, besides the supply pipe 11 and delivery pipe 6 which are equipped with connecting sections to other pipes, connections for the cleaning fluid inlet pipe 7 as well as for the steam inlet pipe 3 and steam outlet pipe 4 are provided at suitable locations.

Although the valve device A for the sterile production material shown in the appended figures is explained by showing the steam inlet pipe 3 and steam outlet pipe 4 in a horizontal configuration, the valve device A should be installed so that the steam inlet pipe 3 and the steam outlet pipe 4 are aligned vertically with steam inlet pipe 3 on the top and steam outlet pipe 4 on the bottom so that residue will be discharged automatically. This ensures that the chamber 5 will be completely free of residue.

Next, we will describe the device that uses the aforesaid valve device to feed sterile fluid production material to a filling unit, which is a production processing stage for the sterile fluid production material.

Figure 2:
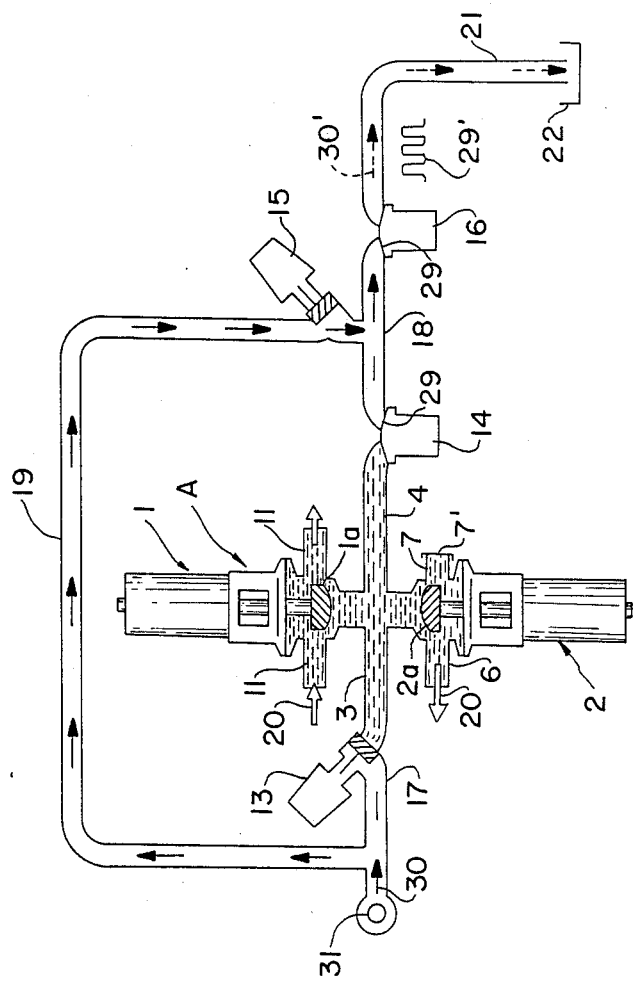
FIG. 2 schematically shows the device for feeding sterile fluid production material, using the valve device of FIG. 1, to production processing stages for the sterile fluid production material, wherein the open/closed state of each valve is shown when the sterile fluid production material is being fed to an operating filling unit, not illustrated.

In FIG. 2, the device that uses the valve device A for sterile production material of the present invention to feed sterile fluid production material 20 from the main pipe, which is the product line, to the filling unit is shown schematically, indicating the open/closed state of the valve when the filling unit (not illustrated) is operating.

Figure 5:
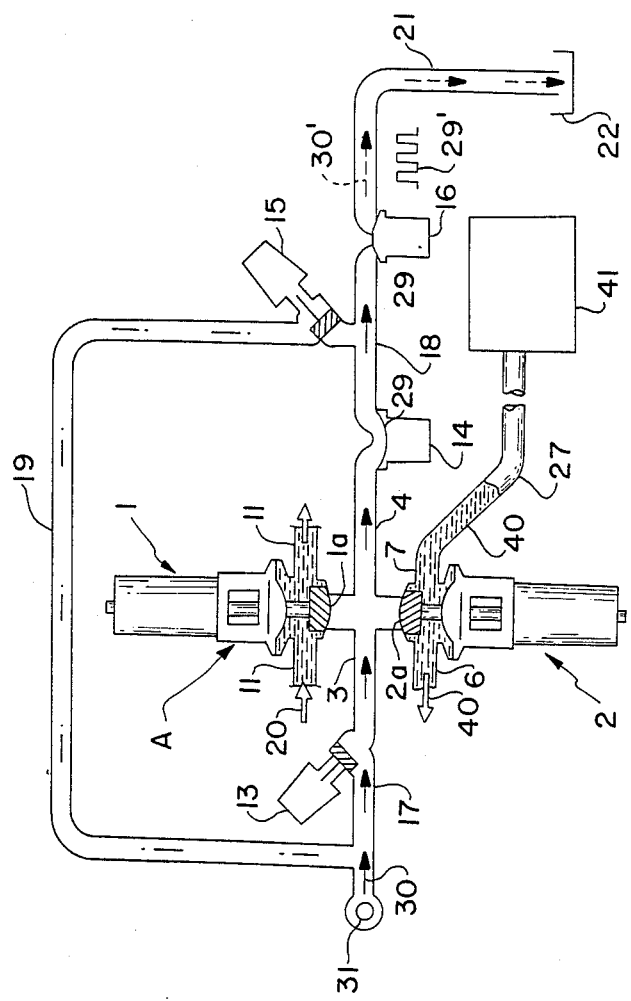
FIG. 5 schematically shows the state of the aforesaid device when other filling units connected on the product line are operating, and the filling unit that is connected on the valve device is being cleaned.
Figure 7:
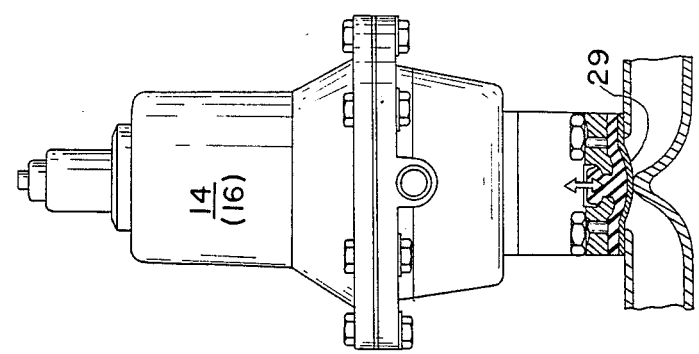
FIG. 7 is a partial profile showing the state when the flutter steam barrier is closed.
Figure 6:
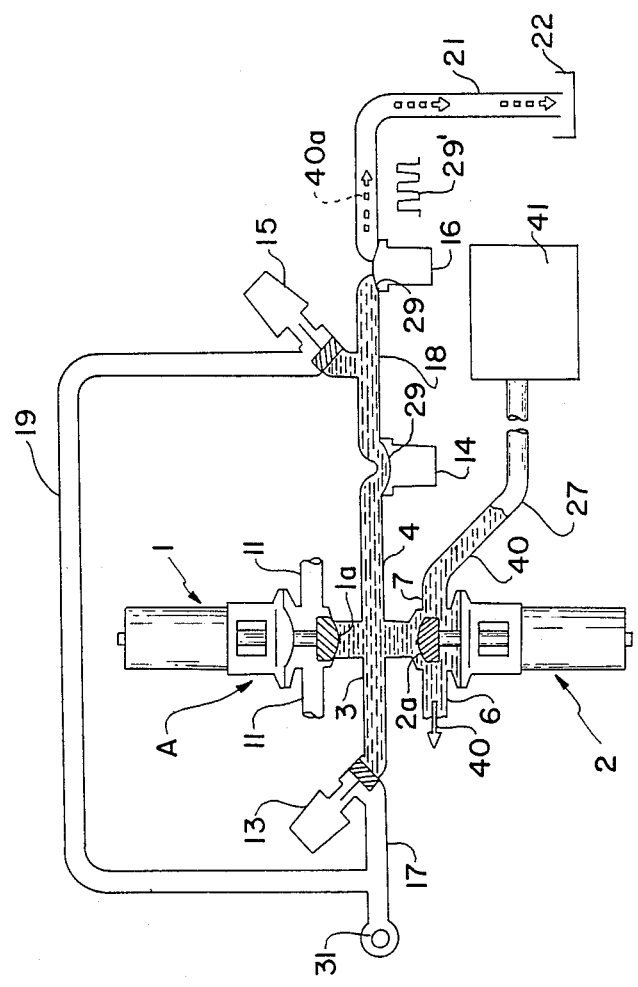
FIG. 6 schematically shows the state of the aforesaid device when operation is halted for all filling units connected on the product line and the filling units are being cleaned.

As a simplified version of the entire device, this figure shows the valve device A for sterile production material, shown in detail in FIG. 1, so that the operating status of facing valves 1 and 2 can be understood. The pair of supply pipes 11 and 11 of valve 1 are connected to the product line (main pipe), which is the sterile production material supply pipe; and the delivery pipe 6 of valve 2 is connected so as to communicate fluid to the filling unit, not illustrated. Next, a first steam valve 13 is attached to the steam inlet pipe 3 of the valve device A and a steam source 31 is connected through a pipe 17 so as to feed sterilizing, pressurized, high temperature steam 30 to the steam valve 13. A steam barrier 14 for blocking the flow of steam on the main pipe side of valve device A, that is, to the valve 1 connected to the steam outlet pipe 4 of the valve device A, and the steam barrier 14 is connected through a pipe 18 to a flutter steam barrier 16 so that residual production material or steam discharged from the flutter steam barrier 16 passes through a discharge pipe 21 connected to the flutter steam barrier 16 so as to be discharged into a discharge drain 22. A second steam valve 15 is located on a pipe 19 that connects the pipe 17 connecting the steam valve 13 and the steam source 31 to the pipe 18 communicating fluid between the steam barrier 14 and the flutter steam barrier 16 so it can open and close the flow from the pipe 17 to the pipe 18 in order to create a sterilizing steam barrier for the valve device A when a filling unit is operating. Moreover, valve 2 on the delivery pipe 6 side of the valve device A is equipped with an inlet pipe 7 for cleaning fluid so that fluid can be communicated intermittently from the cleaning unit 41, as illustrated in FIG. 5 and FIG. 6. In the aforesaid device, solenoid valves for opening and closing the normal steam flow are used for the first steam valve 13 and second steam valve 15. The solenoid valves are equipped with unevenly deformable valve membranes 29 made of rubber and located in areas where the flow path is opened and closed as shown in FIG. 7. The solenoid valves are used so that the steam barrier 14 and the flutter steam barrier 16 can create a barrier of sterilizing steam for the valve device A and so that resistance is low when residue of the fluid production material passes out from the valve device A. Also, the flutter steam barrier 16 is closed intermittently by a control signal so that the steam flow is discharged intermittently to the outside.

The device shown in FIG. 2 is shown in a state where a filling unit, not illustrated, is operating and a packaging container is being processed. After the required cleaning and disinfecting has been performed for the product line side and for the filling unit side, the connection for feeding cleaning fluid to valve 2 is interrupted by closing 7' the inlet pipe 7 of the valve 2. In addition, the first steam valve 13 and steam barrier 14 are closed, and the flutter steam barrier 16 is closed intermittently. Thereafter, the second steam valve 15 is opened, sterilizing steam 30 is fed through pipe 19 from the steam source 31 to pipe 18. The steam passes through the flutter steam barrier 16 as valve 29 intermittently opens and closes in a pulsating manner as shown by the waveform 29'. The steam 30' that has passed through the flutter steam barrier 16 is discharged from the discharge pipe 21 into the discharge drain 22. Also, the valve plugs 1a and 2a of valves 1 and 2 in valve device A open at this time, and sterile fluid production material 20, which was fed into the product line, passes through valve device A from supply pipe 11 and is fed from delivery pipe 6 to the filling unit, not illustrated. At this time, high-temperature sterilizing steam 30 covers both the back part of the first steam valve 13 that opens and closes, as well as the outside of the closed part of steam barrier 14, which are on opposite sides of valve device A. The steam 30 maintains a high-temperature sterile environment without cooling since new high-temperature steam 30 is successively fed behind it by the pulsating opening and closing of the flutter steam valve 16, while sterile fluid production material 20 is fed to the filling unit in a completely protected sterile state. The various types of valves noted above are controlled by control units, not illustrated, so that the required closing operations are performed according to the operational state.

Figure 3:
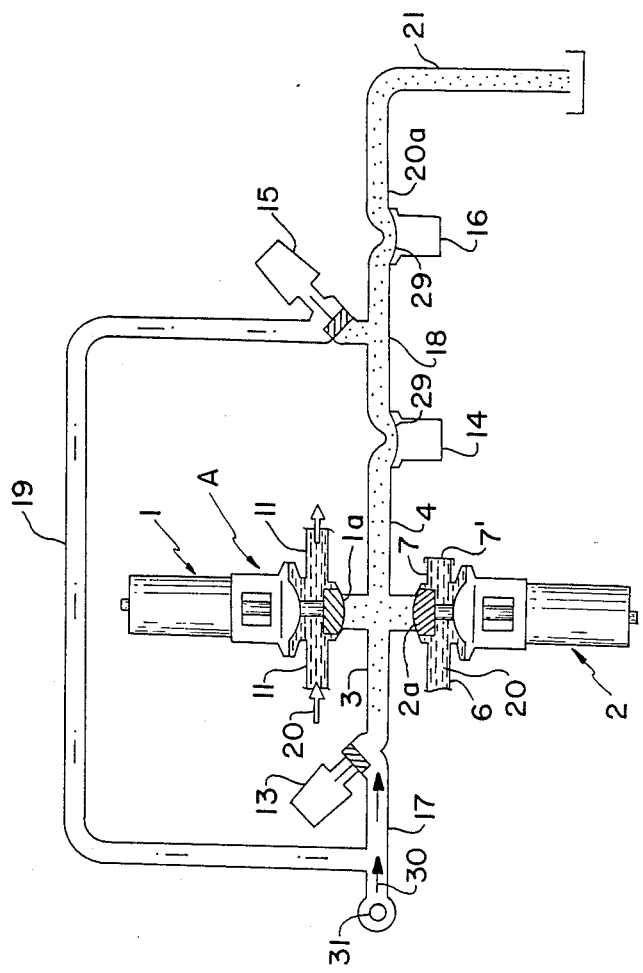
FIG. 3 schematically shows the state of the aforesaid device when the operation of the filling unit has been interrupted and residual production material is discharged from the valve device.

FIG. 3 shows conditions when operation of a filling unit, not illustrated, has been suspended, and residual sterile fluid production material 20a is being discharged from the valve device A. In this case, valve plugs 1a and 2a of the facing valves 1 and 2 in the valve device A have been closed by a valve drive signal from a control unit, which is not illustrated, and the flow of sterile fluid production material 20 through the valve device A is suspended. The inlet pipe 7 for cleaning fluid of valve 2 in the valve device A is closed 7' any time other than when the cleaning fluid is used for cleaning, e.g., the filling unit. Also at this time the first steam valve 13 as well as the steam barrier 14 and flutter steam barrier 16 are open, and the second steam valve 15 is closed. Thus, pressurized high-temperature steam 30, which has been fed from the steam source 31, enters valve device A from steam inlet pipe 3 through pipe 17, moving all residue between valve plugs 1a and 2a, by the strong steam flow, passing the residue 20a from the steam outlet pipe 4 through the open steam barrier 14, pipe 18, and open flutter steam barrier 16, blowing out from the discharge pipe 21, and discharging residue into the discharge drain 22. At this time, since the second steam valve 15 is closed, pipe 19 remains filled but no steam is flowing within said pipe. In the aforesaid case, the sterile fluid production material 20 flows through the main pipe forming the product line and passes through the pair of supply pipes 11 and 11 attached to the product line. The production material 20 is fed to another filling unit which controls the inflow from another similarly connected valve device A. Hence, even thick, high-viscosity fluid production material can be discharged from the discharge pipe 21 without stagnation, because of the aforesaid strong steam jet.

In this way, the device of the present invention never discharges material to filling units as has previously occurred with regard to prior devices. Also, when the steam barrier 14 and flutter steam barrier 16, which use a deformable valve membrane 29 are opened, even high-viscosity material could flow smoothly due to the gently sloping convex surfaces of the members.

Figure 4:
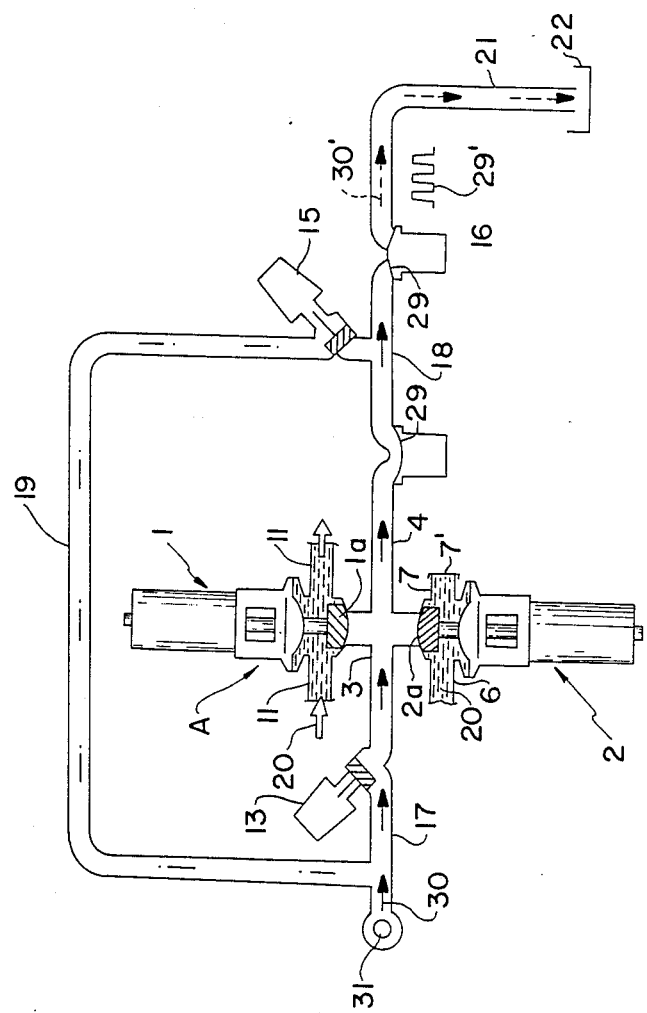
FIG. 4 schematically shows the state of the aforesaid device when the filling unit is temporarily halted while the filling unit is operating.

FIG. 4 shows the condition in which operation is temporarily interrupted when the filling unit is operating. In this case, in a manner similar to that described above, valves 1 and 2 in the valve device A for sterile production material and the second steam valve 15 are closed by a valve drive signal from a control unit, which is not shown in FIG. 4. The flutter steam barrier 16 is intermittently closed due to the pulsating opening and closing of the valve 29 in the flutter steam barrier 16, and the first steam valve 13 on the steam source 31 side as well as the steam barrier 14 located on the opposite side of the valve device A from the first steam valve 13 are open. This state is one in which the flutter steam barrier 16 is intermittently closed while the various valves when the filling unit is halted are as described above. In operation, the various valves are closed in this manner to create a communicating path through the pipe from the steam source 31 to the flutter steam valve 16, including the space between the facing valve plugs 1a and 2a which are closed within the aforesaid valve device A from which residue has been discharged. The flutter steam barrier 16 is intermittently opened and closed, so that the pipe section, in which the communicating path has been created, is filled with sterilizing steam 30. The valve 29 of the flutter steam barrier 16 is opened and closed in a pulsating manner as shown by wave form 29'. Thus, high-temperature steam is gradually supplied from the steam source 31 to the pipe section in which the communicating path has been created and a high temperature is maintained since high-temperature, pressurized steam 30 gradually escapes 30' to the discharge pipe 21. Therefore, sterile fluid production material 20 passing through the pair of supply pipes 11 and 11, which are connected to the product line of valve device A, is protected by a partition (barrier) of sterilizing steam that continues to maintain a high temperature so that the production material is maintained in a completely sterile state, and other filling units connected on the product line can continue to carry out sterile filling operations safely. Steam filling pipe 19 is prevented from flowing into pipe 18 from pipe 19. By switching from the condition described above to the open/closed state of the valves shown in FIG. 2, sterile fluid production material 20 can be delivered on the filling unit side from the delivery pipe 6 of valve 2 while the sterile state is maintained.

FIG. 5 shows the state in which other filling units connected on the product line are operating, and the filling unit, not illustrated, that is connected on the valve device A for sterile production material 20, which is illustrated, is being cleaned. Specifically, pipe 27 for feeding cleaning fluid 40 from the cleaning unit 41 is connected to the inlet pipe 7 of valve 2 in the valve device A. Also, valves 1 and 2 of the valve device A and the second steam valve 15 are closed, the flutter steam barrier 16 is intermittently closed, and the first steam valve 13 and steam barrier 14 are open. Hence, after the open/closed states of the various valves of this device are set in the states shown in FIG. 4, pipe 27 is connected from the cleaning unit 41 to valve 2 of the valve device A as shown in FIG. 5 so that cleaning fluid 40 is fed on the filling unit side from the supply pipe 6. If multiple filling units connected on the same product line (main pipe) are operating while the filling unit connected on the valve device A, which is shown in FIG. 5, is being cleaned in the manner described above, then sterile fluid production material 20 flowing through the aforesaid supply pipes 11 and 11, which form the product line, is handled in a similar manner as described above enabling the other filling units to continue to operate safely. Valve 1 on the product line side of valve device A is maintained in a completely sterile state without fear of contamination because the aforesaid sterilizing partition (barrier) is created between the closed portions of valve plug 1a and valve plug 2a, that is, between valve device A.

FIG. 6 shows the condition in which, although not directly related to the subject of the present invention, production is suspended for all filling units connected on the product line, and the filling units are being cleaned. Since the product line production has been suspended, no sterile fluid production material 20 is flowing through supply pipes 11 and 11 of valve 1 in the valve device A for sterile production material connected to the line, and no sterilizing steam 30 is flowing into this device from the steam source 31. Also, valve 1 of the valve device A, the first steam valve 13, and second steam valve 15 are closed; valve 2 of valve device A and the steam barrier 14 are open; the flutter steam barrier 16 is intermittently closed; pipe 27 is connected from the cleaning unit 41 to the inlet pipe 7 of valve 2; and cleaning fluid 40 is fed to valve 2, which is open. By proceeding in this manner, cleaning fluid 40 is fed on the filling unit side from the delivery pipe 6 of valve 2 in valve device A; the cleaning fluid 40 fills the section from the space between valve plug 1 and valve plug 2 to the first steam valve 13, which is the steam inlet pipe 3, passes through the steam barrier 14 from the steam outlet pipe 4, and fills the area between the second steam barrier 15 and the flutter steam barrier 16 from pipe 18. Then the cleaning fluid 40 gradually is discharged, see flow 40a, on the discharge side of pipe 21, flowing into the discharge drain 22 by the opening and closing of the pulse curve 29' operating valve 29 of the flutter steam barrier 16. In this way, the space between the facing valve plugs 1a and 2a of valve device A is cleaned. The product line side also is cleaned by other means to prepare for the next production run. Before filling the filling units connected on the product line, the open/closed states of the valves at production time should be set as shown in FIG. 2 after the product line, filling unit side, and production material flow path of valve device A have been disinfected.

In each of the figures that show the various operating conditions of the preferred embodiment, the valve device A, steam barrier 14, and flutter steam barrier 16 were positioned horizontally for the sake of convenience. However, these elements could be positioned vertically for similar reasons given earlier in the explanation of the valve device A for the sterile production material. Although the connecting pipes between the various valves were schematically shown in the explanation to be longer than their actual lengths, they should be connected with lengths as short as possible so that the device operates efficiently. Naturally, the design or construction of the device of the present invention can be modified, incorporating many of the characteristics found in this explanation without deviating from the basic concept of the present invention.

The valve device of the present invention at distribution points that feed sterile fluid production material from a main pipe, which is the product line, to a production processing stage such as filling, and uses pressurized, high-temperature steam for disinfecting the inside of the valve device, discharging, outside the device but not on the production processing unit side, residual fluid production material in the valve that opens and closes to control the transfer of the fluid production material from the main pipe to the production processing stage so that the remaining fluid production material does not enter the production processing stage. By filling the area between the pair of valves, with the valves closed, with sterilizing steam from the steam inlet pipe after the residue has been discharged, the present invention can prevent contamination of the sterile fluid production material flowing through the main pipe.

Furthermore, by providing an inlet pipe for cleaning fluid at the valve on the delivery pipe side of the pair of facing valves, tee inside of the valve device and the unit on the production processing stage side can be easily cleaned.

In addition, by making the facing surfaces of the pair of valve plugs hemispherical in shape, the path between the valve plugs narrows and the flow velocity of sterilizing steam that passes between the valve plugs is accelerated. Consequently the steam is forcefully discharged from the valve device causing residue near the valve plugs to be discharged, which is particularly effective for thick, high-viscosity sterile fluid production material such as tomato ketchup.

Finally, since the diameters of the steam inlet pipe and steam outlet pipe widen in the areas connecting to the chamber in the center of the valve device, and since the present invention has a steam diverter located inside the steam inlet pipe, residue of the aforesaid fluid production material located in corner areas near the valve seat of the bases of the valve plugs, where the residue is likely to remain, is forcefully removed, allowing the aforesaid area to be cleaned more effectively.

Using the valve device of the present invention, the steam inlet pipe of the valve device is connected to a steam source through a steam valve that opens and closes the flow path thereto. The steam outlet pipe of the valve device is connected on the discharge pipe side through at least a steam barrier, the device for feeding sterile fluid production material to production processing stages for the sterile fluid production material can feed the sterile fluid production material to the filling production stage maintained in a sterile state while the production processing stage unit is operating. The opening and closing of the pair of valves of the valve device and the opening and closing of the valves of the steam valve and steam barrier, which are located on opposing sides of the valve device, are controlled at times when the production material is being fed from the main pipe to the production processing stages such as filling. When production is suspended by halting the machines, residue of the sterile production material in the valve device is discharged to the outside from the steam barrier by steam from the connected steam source so that the residue does not enter on the production processing stage unit side, increasing the efficiency of production operations such as, for example, preventing packaging loss when filling operations are restarted.

Next, by further providing a flutter steam barrier on the discharge side of the steam barrier of the aforesaid device, by providing a second team valve located in the pipe that connects the pipe between the steam source and the aforesaid steam valve (first steam valve) to the pipe between the steam barrier and the flutter steam barrier, and by providing an inlet pipe for cleaning fluid connected to the valve on the delivery pipe side of the valve device, the sterile state of fluid production material passing through the valve device can be completely maintained when the production processing stage unit is operating, since the outsides of the valves on the sides of the flow path for fluid production material flowing through the valve device are covered with high-temperature steam. When the production processing stage unit is halted while another unit on the product line is operating, the sterile state on the product line side of the valve device can be completely maintained beyond the capability of conventional devices since a barrier is formed by high-temperature sterilizing steam fed gradually between the pair of valves of the valve device, and both the production processing unit and the valve device can be cleaned efficiently because of the intermittent connection of the cleaning unit to the inlet pipe of the valve on the delivery pipe side of the valve device.

Finally, besides feeding sterile fluid production material from the product line to filling units or feeding the production material to storage devices in sterile packaging industries, the aforesaid valve device and the device that uses the valve device, which were illustrated and explained above, can also be used effectively for feeding thick, high-viscosity, sterile fluid production materials from a product line to various types of production processing stages or storage devices for the production material in chemical industries other than sterile packaging industries, providing a significant advantage in increasing production efficiency in the production processing stages of the industries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A valve device for use in a transfer line for sterile fluid production material that communicates fluid from a supply pipe for said sterile fluid production material by opening and closing the flow path for the operating line comprising:
   a first valve operatively connected to said supply pipe;
   a second valve operatively connected to a delivery pipe for at least communicating fluid to processing stages for the above-mentioned sterile fluid production material;
   a first valve plug having a first central axis operatively mounted within said first valve and having a first valve head for engaging a first valve seat;

a second valve plug having a second central axis operatively mounted within said second valve and having a second valve head for engaging a second valve seat;

said first and second central axis being aligned in a first common axis;

said first valve head and said second valve head facing each other and being spaced from each other along said common axis to provide a gap therebetween, a steam inlet pipe and a steam outlet pipe positioned substantially perpendicular to said common axis of said first and second valves and having axes positioned along a second common axis in said gap located substantially midway between said facing first and second valve plugs of said first and second valves, said steam inlet pipe and said steam outlet pipe being positioned to provide a flow of steam through said gap, said first and second valve heads being movable between open and closed positions, and said first and second valve heads in their closed positions narrowing the flow path of steam in said gap.

2. The valve device for sterile fluid production material according to claim 1, wherein said second valve is equipped with an inlet pipe for selectively supplying a cleaning fluid, said fluid being in communication with said delivery pipe for said sterile fluid production material.

3. The valve device for sterile fluid production material according to claim 2, wherein facing surfaces of said facing first and second valve plugs are hemispherical in shape.

4. The valve device for feeding sterile material to processing stages according to claim 2, wherein said steam inlet pipe is connected to a steam source through a first steam valve for opening and closing the flow path thereto, said steam outlet pipe is connected to a discharge pipe through a steam barrier and flutter steam barrier connected in order following said steam outlet pipe, a second steam valve is located on a first pipe that connects the second pipe connecting said steam valve and said steam source to the discharge pipe communicating fluid between said steam barrier and said flutter steam barrier so as to open and close the path from said second pipe to said first pipe, and wherein the inlet pipe for the cleaning fluid connected to said second valve of said valve device is constructed to permit intermittent communication of fluid from a cleaning unit and for stopping communication of said fluid from said cleaning unit to said inlet pipe anytime other than during cleaning, said first and second valves and said second steam valve are open and said first steam valve, said steam barrier, and said flutter steam barrier are closed when said processing stages are initiated and said fluid processing material is supplied to said processing stages, said first and second valves and said second steam valve are closed and said first steam valve, said steam barrier, and said flutter steam barrier are open when processing stages are stopped, said first and second valves, said second steam valve, and said flutter steam barrier are closed and said first steam valve and said steam barrier are open when said processing stages are temporarily interrupted, at least said first valve of said valve device, said second steam valve, and said flutter steam barrier are closed and said steam barrier is open while either said second valve of said valve device is closed and said first steam valve is open or said second valve of said valve device is closed and said first steam valve is closed when cleaning for supplying said cleaning fluid from said cleaning unit through said inlet pipe to said second valve.

5. The valve device for sterile fluid production material according to claim 1, wherein facing surfaces of said facing first and second valve plugs are hemispherical in shape.

6. The valve device for sterile fluid production material according to claim 5, wherein the diameters of said steam inlet pipe and said steam outlet pipe widen in the areas connecting on said chamber to form hollow cones with interior ends positioned adjacent to the openings of said first and second valves and wherein a steam diverter with a hollow, small-diameter section and a hollow cone section is located inside said steam inlet pipe for forming a specific gap between said steam diverter and the inner wall of the end section of said steam inlet pipe.

7. The valve device for feeding sterile fluid production material to processing stages according to claim 6, wherein the steam inlet pipe of said valve device is connected to a steam source through a steam valve for opening and closing the flow path of said steam inlet pipe and wherein said steam outlet pipe is connected to a discharge pipe through at least a steam barrier so that said first and second valves open and said steam valve and said steam barrier close when production material processing stages are initiated and said sterile fluid production material is supplied to said production stages and said first and second valves close and at least said steam valve and said steam barrier open when said processing stages are stopped.

8. The valve device for feeding sterile fluid production material to processing stages according to claim 6, wherein said steam inlet pipe is connected to a steam source through a first steam valve for opening and closing the flow path thereto, said steam outlet pipe is connected to discharge pipe through a steam barrier and connected to a discharge pipe through a stream barrier and flutter steam barrier connected in order following said steam outlet pipe, a second steam valve is located on a first pipe that connects the second pipe connecting said steam valve and said steam source to the discharge pipe communicating fluid between said steam barrier and said flutter steam barrier so as to open and close the path from said second pipe to said first pipe, and wherein an inlet pipe for cleaning fluid connected to said second valve of said valve device is constructed to permit intermittent communication of fluid from a cleaning unit and for stopping communication of said fluid from said cleaning unit to said inlet pipe anytime other than during cleaning, said first and second valves and said second steam valve are open and said first steam valve, said steam barrier, and said flutter steam barrier are closed when said processing stages are initiated and said fluid processing material is supplied to said processing stages, said first and second valves and said second steam valves are closed and said first steam valve, said steam barrier, and said flutter steam barrier are open when processing stages are stopped, said first and second valves, said second steam valve, and said flutter steam barrier are closed and said first steam valve and said steam barrier are open when said processing stages are temporarily interrupted, at least said first valve of said valve device, said second steam valve, and said flutter steam barrier are closed and said steam barrier is open while either said second valve of said valve device is closed and said first steam valve is open or said second valve of said valve device is closed and said first steam valve is closed when closing for supplying said cleaning fluid from said cleaning unit through said inlet pipe to said second valve.

9. The valve device for feeding sterile fluid production material to processing stages according to claim 5, wherein the steam inlet pipe of said valve device is connected to a steam source through a steam valve for opening and closing the flow path of said steam inlet pipe and wherein said steam outlet pipe is connected to a discharge pipe through at least a steam barrier so that said first and second valves open and said steam valve and said steam barrier close when production material processing stages are initiated and said sterile fluid production material is supplied to said production stages and said first and second valves close and at least said steam valve and said steam barrier open when said processing stages are stopped.

10. The valve device for feeding sterile fluid production material to processing stages according to claim 9, wherein said steam barrier and a flutter steam barrier are equipped with deformable valve membranes.

11. The valve device for feeding sterile fluid production material to processing stages according to claim 5, wherein said steam inlet pipe is connected to a steam source through a first steam valve for opening and closing the flow path thereto, said steam outlet pipe is connected to a discharge pipe through a team barrier and flutter steam barrier connected in order following said steam outlet pipe, a second steam valve is located on a first pipe that connects the second pipe connecting said steam valve and said steam source to the discharge pipe communicating fluid between said steam barrier and said flutter steam barrier so as to open and close the path from said second pipe to said first pipe, and wherein an inlet pipe for cleaning fluid connected to said second valve of said valve device is constructed to permit intermittent communication of said cleaning fluid from a cleaning unit and for stopping communications of said fluid from said cleaning unit to said inlet pipe anytime other than during cleaning, said first and second valves and said second steam valve are open and said first steam valve, said steam barrier, and said flutter steam barrier are closed when said processing stages are initiated and said fluid processing material is supplied to said processing stages, said first and second valves and said second steam valve are closed and said first steam valve, said steam barrier, and said flutter steam barrier are open when processing stages are stopped, and first and second valves, said second steam valve, and said flutter steam barrier are closed and said first steam valve and said steam barrier are open when said processing stages are temporarily interrupted, at least said first valve of said valve device, said second steam valve, and said flutter steam barrier are closed and said steam barrier is open while either said second valve of said valve device is closed and said first steam valve is open or said second valve of said valve device is closed and said first steam valve is closed when cleaning for supplying said cleaning fluid from said cleaning unit through said inlet pipe to said second valve.

12. The valve device for feeding sterile fluid production material to processing stages according to claim 1, wherein the steam inlet pipe of said valve device is connected to a steam source through a steam valve for opening and closing the flow path of said steam inlet pipe and wherein said steam outlet pipe is connected to a discharge pipe through at least a steam barrier so that said first and second valves open and said steam valve and said steam barrier close when production material processing stages are initiated and said sterile fluid production material is supplied to said production stages and said first and second valves close and at least said steam valve and said steam barrier open when said processing stages are stopped.

13. The valve device for feeding sterile fluid production material to processing stages according to claim 12, wherein said steam barrier and a flutter steam barrier are equipped with deformable valve membranes.

* * * * *